(12) United States Patent
Shin

(10) Patent No.: US 7,090,233 B2
(45) Date of Patent: Aug. 15, 2006

(54) SPINDLE BRACKET FOR REAR SUSPENSION

(75) Inventor: Kyoung-Hoon Shin, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 11/003,433

(22) Filed: Dec. 6, 2004

(65) Prior Publication Data

US 2006/0033303 A1 Feb. 16, 2006

(30) Foreign Application Priority Data

Aug. 10, 2004 (KR) ...................... 10-2004-0062729

(51) Int. Cl.
*B60G 3/12* (2006.01)

(52) U.S. Cl. ........................... 280/93.512; 280/124.153

(58) Field of Classification Search ......... 280/124.128, 280/124.125, 124.153, 93.512
See application file for complete search history.

(56) References Cited

U.S. PATENT DOCUMENTS

| | | | | |
|---|---|---|---|---|
| 2,300,169 A * | 10/1942 | Burton | ........................ | 267/247 |
| 2,771,301 A * | 11/1956 | Booth et al. | ........... | 280/93.512 |
| 4,143,888 A * | 3/1979 | Heinig | ................. | 280/124.148 |
| 4,429,900 A * | 2/1984 | Feher | ................... | 280/124.128 |
| 4,486,030 A * | 12/1984 | Takata et al. | ......... | 280/124.107 |
| 4,582,338 A * | 4/1986 | Colanzi | ............... | 280/124.146 |
| 4,618,159 A * | 10/1986 | Kozyra et al. | ......... | 280/93.512 |
| 4,671,532 A * | 6/1987 | Matschinsky et al. | .................... | 280/124.143 |
| 4,674,760 A * | 6/1987 | Goulart | ........................ | 280/88 |
| 4,725,074 A * | 2/1988 | Stevens | ............... | 280/124.128 |
| 5,324,073 A * | 6/1994 | Alatalo et al. | ........ | 280/124.116 |
| 5,366,233 A * | 11/1994 | Kozyra et al. | ......... | 280/93.512 |
| 5,924,711 A * | 7/1999 | Schote | ................. | 280/124.111 |
| 6,047,978 A * | 4/2000 | Watanabe et al. | ..... | 280/124.106 |
| 6,059,314 A * | 5/2000 | Streubel et al. | ............. | 280/798 |
| 6,086,162 A * | 7/2000 | Pinch et al. | ............. | 301/124.1 |
| 6,267,397 B1 * | 7/2001 | Hamada et al. | ....... | 280/124.128 |
| 6,401,319 B1 * | 6/2002 | Hicks et al. | ............... | 29/407.1 |
| 6,419,250 B1 * | 7/2002 | Pollock et al. | ......... | 280/93.512 |
| 6,460,869 B1 * | 10/2002 | Tremouilles | ........... | 280/124.128 |
| 6,491,306 B1 * | 12/2002 | Schaffer | .................. | 280/5.502 |
| 6,616,156 B1 * | 9/2003 | Dudding et al. | ....... | 280/93.512 |
| 6,672,605 B1 * | 1/2004 | Basnett | ................ | 280/124.128 |
| 6,883,629 B1 * | 4/2005 | Hanagan | ..................... | 180/211 |
| 6,902,176 B1 * | 6/2005 | Gottschalk | ............. | 280/93.512 |
| 6,935,646 B1 * | 8/2005 | Inoue et al. | .......... | 280/124.106 |
| 2002/0079666 A1 * | 6/2002 | Basnett | ................ | 280/124.128 |
| 2003/0111819 A1 * | 6/2003 | Bae | ..................... | 280/124.177 |

FOREIGN PATENT DOCUMENTS

KR 100452202 10/2004

OTHER PUBLICATIONS

English Language Abstract of Korea 10-0452202.

* cited by examiner

*Primary Examiner*—Paul N. Dickson
*Assistant Examiner*—Barry Gooden, Jr.
(74) *Attorney, Agent, or Firm*—Greenblum & Bernstein, P.L.C.

(57) ABSTRACT

A spindle bracket for rear suspensions includes a bracket body welded to a trailing arm and having a mounting hole into which a spindle is inserted, and a lateral strength reinforcing piece secured between the trailing arm and the bracket body.

3 Claims, 2 Drawing Sheets

SPINDLE BRACKET FOR REAR SUSPENSION

RELATED APPLICATIONS

The present disclosure relates to subject matter contained in priority Korean Application No. 10-2004-0062729, filed on Aug. 10, 2004, which is herein expressly incorporated by reference in its entirety.

BACKGROUND OF THE INVENTION

1. Field of the Invention

The present invention relates generally to a spindle bracket for rear suspensions and, more particularly, to a spindle bracket for rear suspensions, which has at a mounting hole thereof a lateral strength reinforcing piece to be secured between a trailing arm and a bracket body, thus increasing the ability to withstand lateral force, when the lateral force acts on outside wheels.

2. Description of the Related Art

Generally, a suspension insulates a vehicle body from vibration or shocks transmitted through a road surface while a vehicle is running, thus preventing the vehicle body or baggage from being damaged and providing a smoother ride. As shown in FIG. 1, a rear suspension includes a torsion beam 1 which is installed in a transverse direction of a vehicle body. Trailing arms 2 are welded to opposite ends of the torsion beam 1. A spindle bracket 3 is welded to each of the trailing arms 2 to be perpendicular to the trailing arm 2. The rear suspension also includes shock absorbers 5 and coil springs 4 to absorb shocks transmitted from a road surface, in addition to providing a smoother ride (see, the description of the related art of Korean Patent Laid-Open Publication No. 10-2003-0091324).

At a lower portion H of each spindle bracket 3 is provided a semicircular mounting part to correspond to the shape of the cylindrical trailing arm 2.

Further, when each spindle bracket 3 is welded to an associated trailing arm 2, as shown in FIG. 2, a welded part W comprises a lower end $W_1$ of the spindle bracket 3 and both sides $W_2$ and $W_3$ of the spindle bracket 3.

However, the conventional spindle bracket has a problem in that a span S between a wheel center C and the welded part W is large, so that it is weak in a lateral direction.

SUMMARY OF THE INVENTION

Accordingly, the present invention has been made keeping in mind the above problems occurring in the prior art, and an object of the present invention is to provide a spindle bracket for rear suspensions, which has at a mounting hole thereof a lateral strength reinforcing piece to be secured between a trailing arm and a bracket body, thus increasing lateral strength.

In order to accomplish the above object, the present invention provides a spindle bracket for rear suspensions, including a bracket body which is welded to a trailing arm and has a mounting hole into which a spindle is inserted, and a lateral strength reinforcing piece which is secured between the trailing arm and the bracket body.

Preferably, the lateral strength reinforcing piece is welded to the trailing arm.

Further, the lateral strength reinforcing piece is bent at an end of the mounting hole. Thus, an end of the lateral strength reinforcing piece is bent, while an opposite end of the lateral strength reinforcing piece is welded to the trailing arm.

Such a construction increases the number of welded parts, and reduces the span between the welded part and a wheel center, thus increasing lateral strength.

Further, a reinforcing part for increasing lateral strength, namely, the lateral strength reinforcing piece, is fabricated using a part that is normally discarded during the manufacture of a mounting hole, so that an additional reinforcing part is not required but the previously discarded part is used to increase the lateral strength of the spindle bracket, thus maintaining low manufacturing costs thereof.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
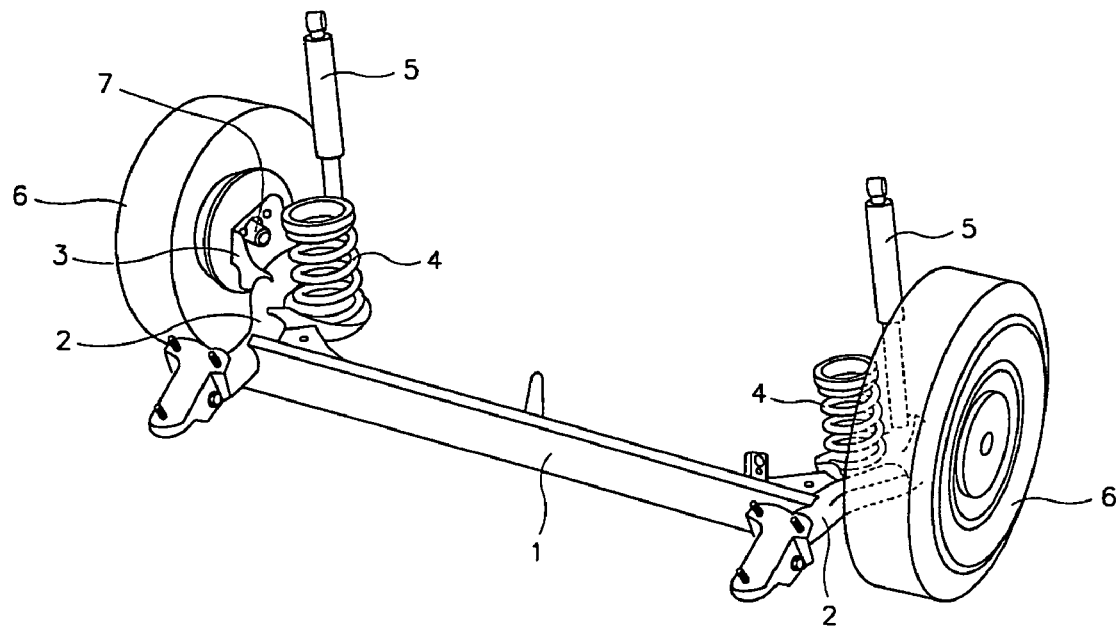
FIG. 1 is a perspective view to show a conventional rear suspension.
Figure 2:
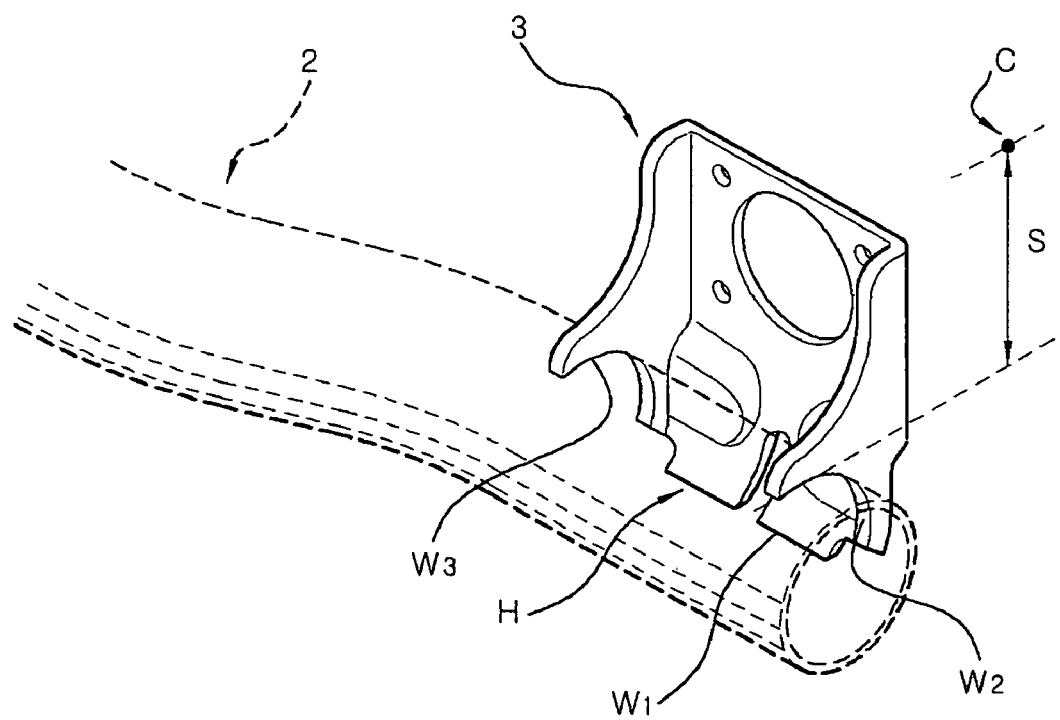
FIG. 2 is a perspective view to show a spindle bracket included in the rear suspension of FIG. 1, when the spindle bracket is mounted in a vehicle.

Reference now should be made to the drawings, in which the same reference numerals are used throughout the different drawings to designate the same or similar components.

Figure 3:
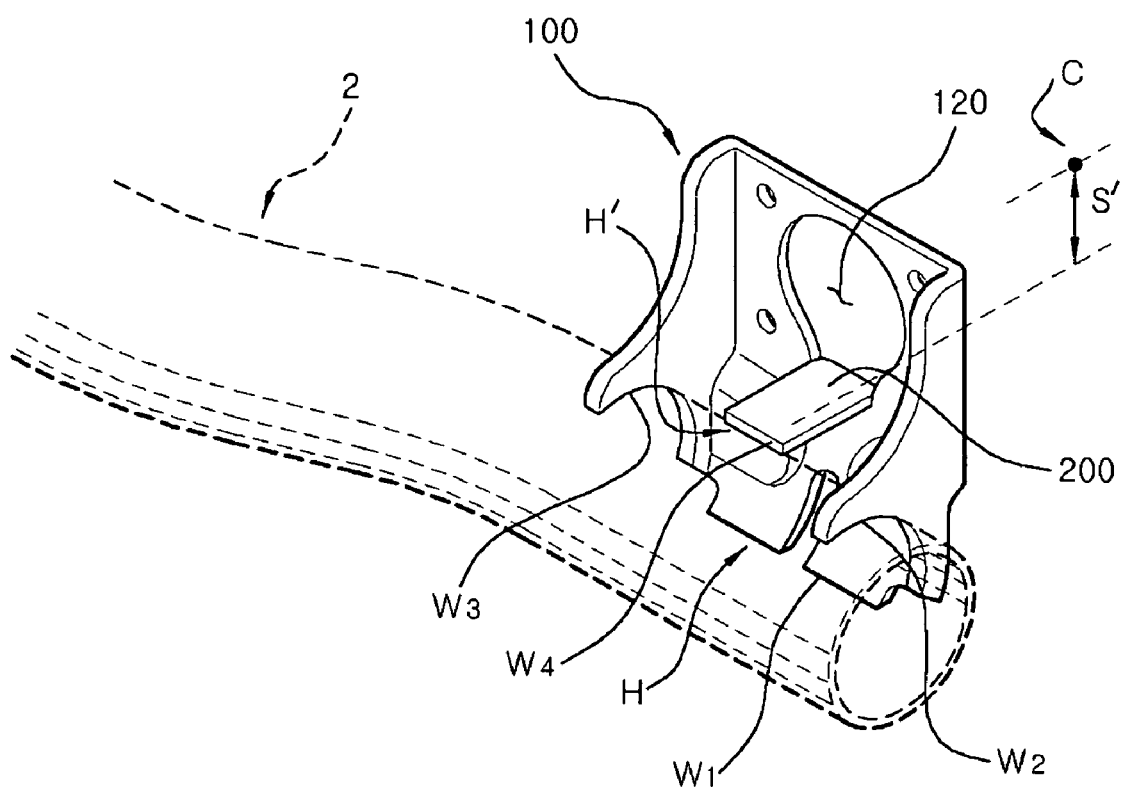
FIG. 3 is a perspective view to show a spindle bracket for rear suspensions, according to a preferred embodiment of the present invention, when the spindle bracket is mounted in a vehicle.

FIG. 3 is a perspective view to show a spindle bracket for rear suspensions, according to a preferred embodiment of the present invention.

As shown in FIG. 3, the spindle bracket of this embodiment includes a bracket body 100 that is welded to a trailing arm 2 and has a mounting hole 120 into which a spindle (not shown) is inserted. The spindle bracket also includes a lateral strength reinforcing piece 200 which is secured between the trailing arm 2 and the bracket body 100.

The lateral strength reinforcing piece 200 is fabricated using a part that is left over from bridge work for increasing lateral strength during the manufacture of the mounting hole 120. The lateral strength reinforcing piece 200 comprises a rectangular plate which horizontally extends from a lower portion of an inner circumference of the mounting hole 120 to a predetermined position.

The operation of this embodiment constructed as described above will be described below.

The lateral strength reinforcing piece 200 is bent at a lower end that is integrated with the bracket body 100 such that an upper end H' of the lateral strength reinforcing piece 200 comes into contact with the trailing arm 2. Subsequently, as shown in FIG. 3, a part $W_4$ of the lateral strength reinforcing piece 200 contacting the trailing arm 2, that is, the upper end H' of the lateral strength reinforcing piece 200, is welded. Thus, the number of welded parts W is increased. Through the bridge work for increasing the lateral strength, a span S' between the welded part W and a wheel center C becomes smaller than the conventional span, thus increasing the lateral strength.

Further, the lateral strength reinforcing piece 200 is fabricated using a part that is normally discarded during the manufacture of the mounting hole 120, thus maintaining low manufacturing costs thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, a rear suspension for motor vehicles according to the present invention provides the following effects.

A lateral strength reinforcing piece is bent at an end thereof and is welded at an opposite end thereof to a trailing arm so that the lateral strength reinforcing piece is installed between the trailing arm and a bracket body, thus increasing the number of welded parts, and reducing the span between the welded part and a wheel center, therefore increasing the lateral strength.

Further, a reinforcing part for increasing lateral strength, namely, the lateral strength reinforcing piece, is fabricated using a part that is normally discarded during the manufacture of a mounting hole, so that an additional reinforcing part is not required but the previously discarded part is used to increase the lateral strength of the spindle bracket, thus maintaining low manufacturing costs thereof due to the reduction in the number of part.

What is claimed is:

1. A spindle bracket for rear suspensions, comprising:
   a bracket body welded to a trailing arm and having a mounting hole into which a spindle is inserted; and
   a lateral strength reinforcing piece secured between the trailing arm and the bracket body,
   wherein a lower end of the lateral strength reinforcing piece is secured in a lower portion of the mounting hole.

2. The spindle bracket as set forth in claim 1, wherein the lateral strength reinforcing piece is bent at an end of the mounting hole.

3. The spindle bracket as set forth in claim 1, wherein an upper end of the lateral strength reinforcing piece is welded to the trailing arm.

* * * * *